June 20, 1967 J. R. MURCHISON ET AL 3,326,353
CONVEYOR SYSTEM WITH JAM RELEASE
Filed Feb. 15, 1966
4 Sheets-Sheet 1
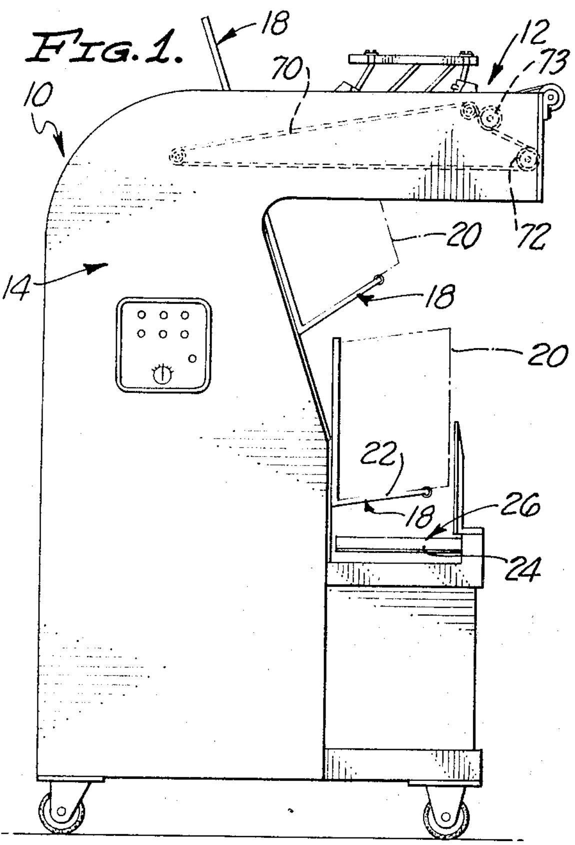
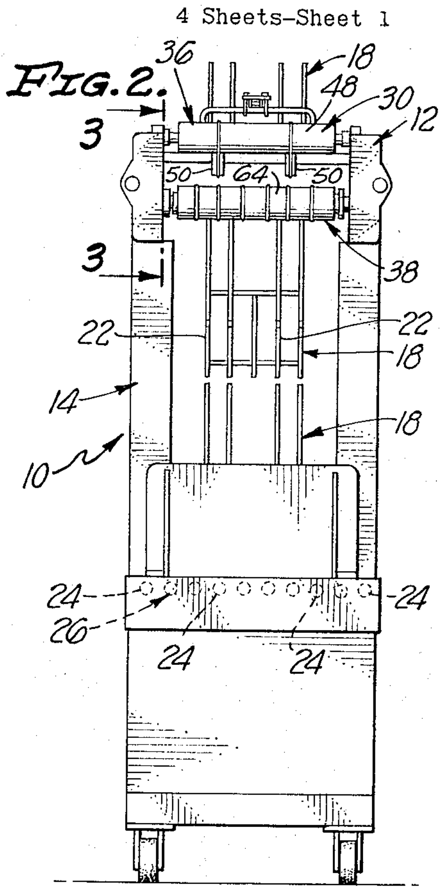
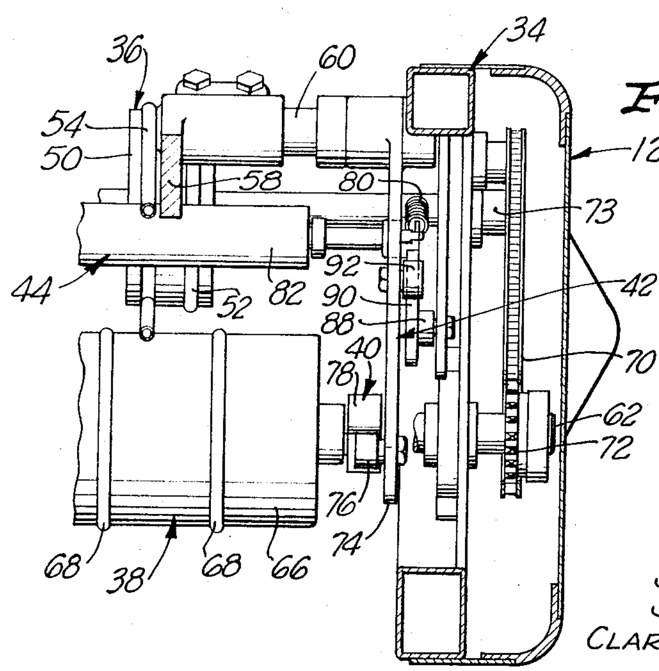
INVENTORS
JOHN R. MURCHISON,
JOHN C. DARNALL,
CLARENCE MORGAN BRASSELL
BY THEIR ATTORNEYS
HARRIS, KIECH, RUSSELL & KERN CONVEYOR SYSTEM WITH JAM RELEASE
Filed Feb. 15, 1966
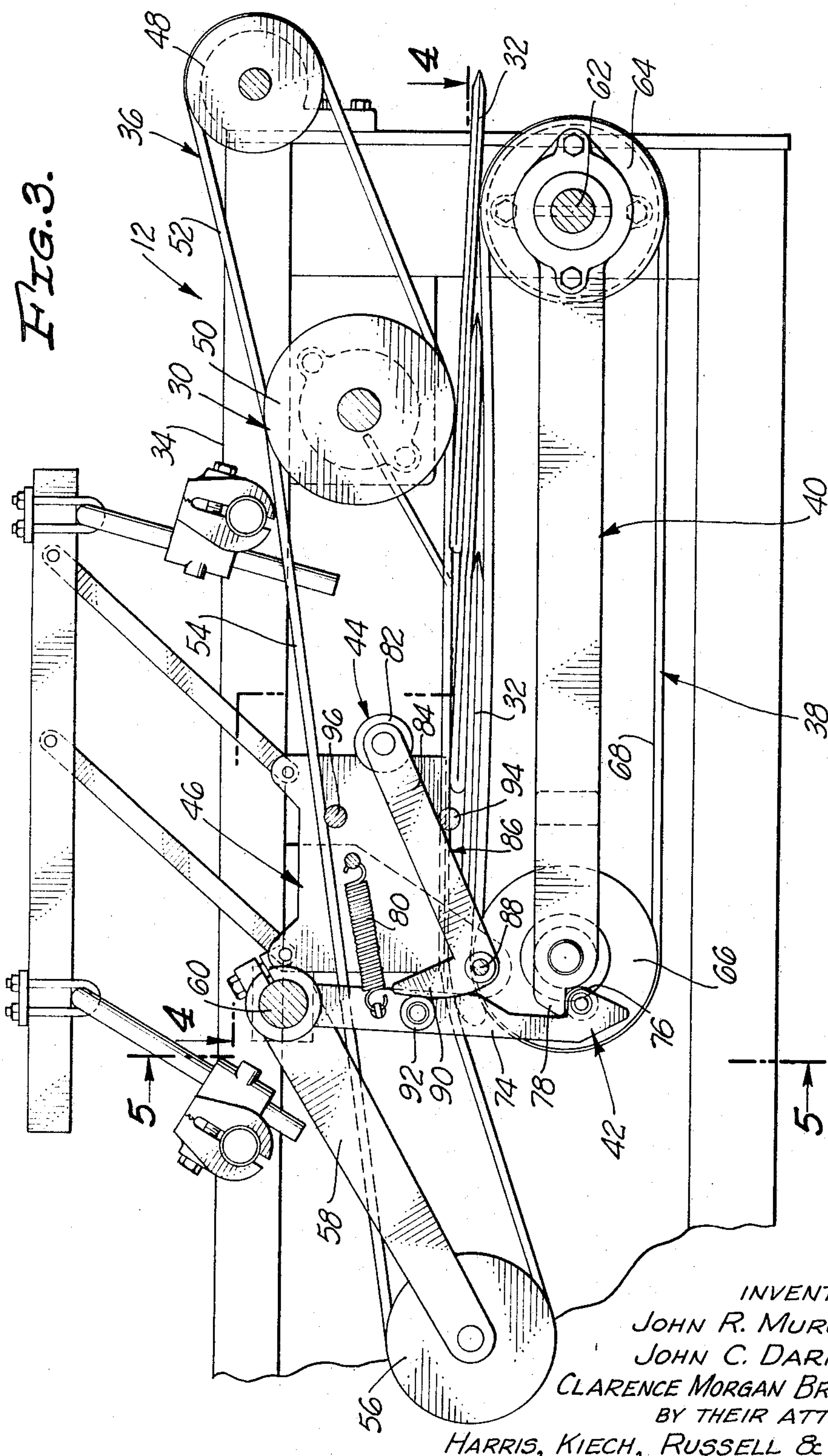
INVENTORS
JOHN R. MURCHISON,
JOHN C. DARNALL,
CLARENCE MORGAN BRASSELL
BY THEIR ATTORNEYS
HARRIS, KIECH, RUSSELL & KERN

CONVEYOR SYSTEM WITH JAM RELEASE

Filed Feb. 15, 1966 4 Sheets-Sheet 3

INVENTORS
JOHN R. MURCHISON,
JOHN C. DARNALL,
CLARENCE MORGAN BRASSELL
BY THEIR ATTORNEYS
HARRIS, KIECH, RUSSELL & KERN

CONVEYOR SYSTEM WITH JAM RELEASE
Filed Feb. 15, 1966 4 Sheets-Sheet 4
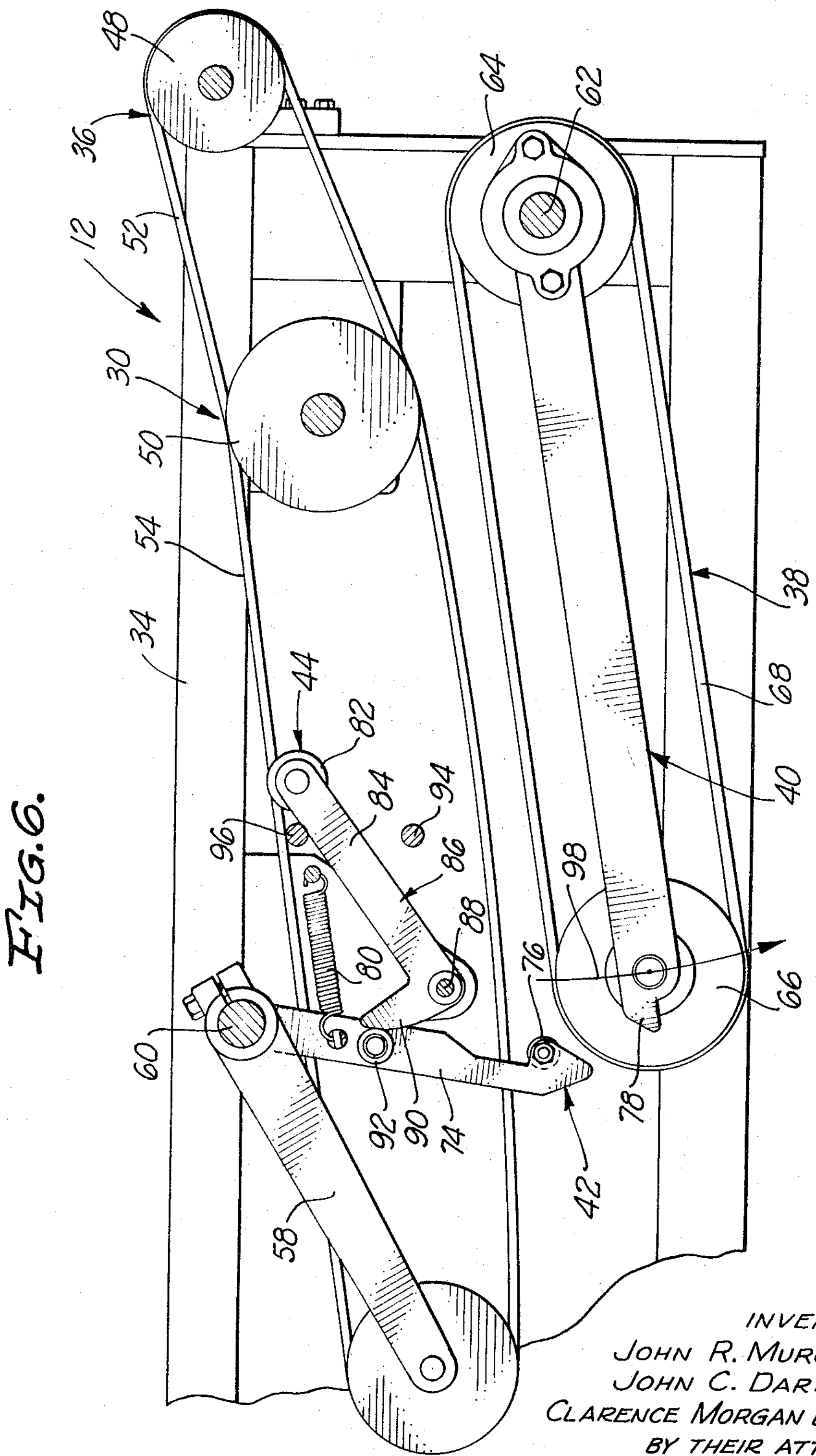
INVENTORS
JOHN R. MURCHISON,
JOHN C. DARNALL,
CLARENCE MORGAN BRASSELL
BY THEIR ATTORNEYS
HARRIS, KIECH, RUSSELL & KERN United States Patent Office 3,326,353

Patented June 20, 1967

3,326,353

CONVEYOR SYSTEM WITH JAM RELEASE

John R. Murchison, Culver City, John C. Darnall, Van Nuys, and Clarence Morgan Brassell, Encino, Calif., assignors to Development and Control Limited SA, Luxembourg, Luxembourg, a Luxembourg corporation Filed Feb. 15, 1966, Ser. No. 527,657
13 Claims. (Cl. 198—165)

The present invention relates in general to conveyors, and a primary object of the invention is to provide a conveyor system having means for diverting the material being conveyed from its normal path in the event of a jam of the material in the conveyor system.

While the invention is applicable to conveyor systems for various materials, it is particularly applicable to a conveyor system for folded newspapers in overlapping relation. Such a conveyor system may be utilized to deliver the newspapers to an apparatus for arranging them in bundles or stacks each containing a predetermined number of papers. For convenience in disclosing the invention, it will be considered in an environment of this nature, although it will be understood that other applications of the invention are possible.

Newspaper conveyor systems characteristically convey the papers at high speeds. Consequently, if a jam occurs, either in the conveyor system itself, or in an apparatus, such as a stacker, to which the stream of newspapers is being delivered, the papers pile up very rapidly and can seriously damage the conveyor system, or equipment associated therewith, before the conveyor system can be shut down.

With the foregoing as background, an important object of the invention is to provide a conveyor system having means for sensing an impending jam in its embryonic stages, and for immediately diverting the stream of newspapers from its normal path to prevent the development of a full-fledged jam. With this construction, damage to the conveyor system and/or associated equipment is prevented, which is an important feature of the invention.

Considering the invention more specifically now an important object thereof is to provide a conveyor system which includes: conveyor means for conveying the stream of overlapping newspapers along a predetermined path and comprising two conveyors receiving the stream of newspapers therebetween; means mounting one of the conveyors for movement to an inoperative position to divert the stream of newspapers from between the conveyors; and means responsive to a jam in the stream of newspapers between the conveyors for moving the movable conveyor to its inoperative position.

Still more specifically, an important object is to provide a conveyor system which includes: a main frame; conveyor means carried by the main frame and comprising upper and lower conveyors receiving the stream of newspapers therebetween; means mounting the lower conveyor on the main frame for downward pivotal movement under the influence of gravity to divert the stream of newspapers from between the conveyors; means for latching the lower conveyor in its upper position; and means responsive to a jam of newspapers between the conveyors for releasing the latching means to permit the lower conveyor to drop downwardly into a newspaper-diverting position.

Another object of the invention is to provide a conveyor system of the foregoing nature wherein the upstream end of the lower conveyor is pivotally mounted on the main frame, and wherein the downstream end of the lower conveyor is normally latched in its upper position. With this construction, the downstream end of the lower conveyor swings downwardly so that the stream of newspapers can be diverted freely from its normal path.

A further object is to provide a conveyor system of the foregoing character wherein the latching means is pivotally mounted on the main frame for movement between an operative position, wherein it engages and supports the downstream end of the lower conveyor in its upper position, and an inoperative position wherein it disengages the downstream end of the lower conveyor.

An additional object is to provide a construction wherein the jam responsive means includes releasing means pivotally mounted on the main frame for pivoting the latching means from its operative position to its inoperative position in response to a jam of newspapers between the conveyors. Related objects are to provide a conveyor system wherein the releasing means includes roller means engageable with a jam in the stream of newspapers, and includes cam means for pivoting the latching means into its inoperative position to release the downstream end of the lower conveyor.

A further object is to provide a conveyor system wherein the lower conveyor includes a subframe having a free, downstream end engageable by the latching means, and having its upstream end pivotally mounted on the main frame. A related object is to provide pivot means for the upstream end of the subframe which includes a shaft carrying a roller forming part of the lower conveyor.

Yet another object of the invention is to provide a conveyor wherein the upper and lower conveyors respectively comprise upper and lower rollers and/or sheaves having upper and lower belts trained therearound and receiving the stream of newspaper therebetween.

The foregoing objects, advantages, features and results of the present invention, together with various other objects, advantages, features and results thereof which will be evident to those skilled in the conveyor art in the light of this disclosure, may be achieved with the exemplary embodiment of the invention described in detail hereinafter and illustrated in the accompanying drawings, in which:

FIG. 1 is a side elevational view of a newspaper stacking apparatus which embodies the invention;

FIG. 2 is an end elevational view of the newspaper stacker of FIG. 1, and is taken from the right side of FIG. 1;

FIG. 3 is an enlarged, fragmentary sectional view taken as indicated by the arrowed line 3—3 of FIG. 2 and illustrating the conveyor system of the invention in normal operation;

Figure 4:
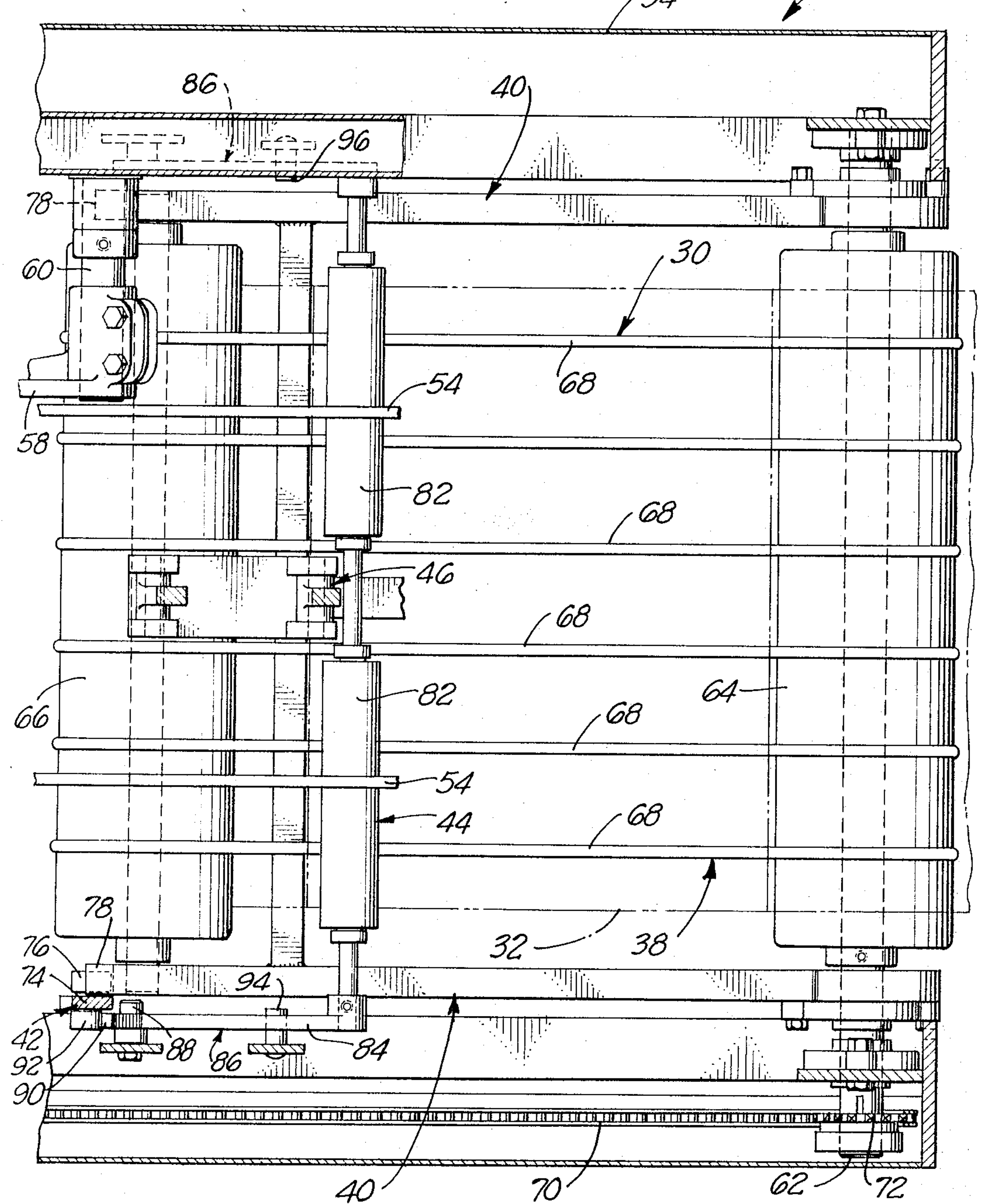

FIGS. 4 and 5 are fragmentary sectional views respectively taken as indicated by the arrowed lines 4—4 and 5—5 of FIG. 3; and FIG. 6 is a view similar to FIG. 3, with some parts omitted, and with the conveyor system of the invention in its released condition to divert a jam of newspapers.

Referring initially to FIGS. 1 and 2 of the drawings, illustrated therein is a newspaper stacker 10 which includes an infeed conveyor section 12 for delivering a stream of newspapers in conventional overlapping relation to a stacking section 14. The infeed conveyor section 12 is provided at its upstream end with suitable connecting means, not shown, for securing the downstream end of a conventional newspaper conveyor system, not shown, thereto.

The stacking section 14 of the newspaper stacker 10 is more fully described and claimed in our co-pending patent application Ser. No. 527,436, filed Feb. 15, 1966. Briefly, it includes a series of downwardly moving racks 18 on which stacks 20 of newspapers are deposited by the infeed conveyor section 12. Each rack 18 includes fingers 22 which support the corresponding stack 20 and which pass between rollers 24 of a takeaway conveyor 26. As will be apparent, as the fingers 22 of each rack 18 move downwardly between the rollers 24 of the takeaway conveyor 26, the corresponding stack 20 of newspapers is deposited on the takeaway conveyor.

With the foregoing as background, the infeed conveyor section 12, in which the present invention is embodied, will now be considered in more detail.

Turning to FIGS. 3 to 6 of the drawings, the infeed conveyor section 12 includes conveyor means 30 for conveying a stream of folded newspapers 32, arranged in conventional overlapping relation, to the stacking section 14, such stream being broken down into stacks 20 within the stacking section as described in our aforementioned co-pending application.

More particularly, the infeed conveyor section 12 includes a main frame 34 carrying upper and lower conveyors 36 and 38 which receive the folded overlapping newspapers therebetween and propel them toward the stacking section 14. The upper conveyor 36 is mounted on the main frame 34. The lower conveyor 38 includes a subframe 40 which is pivotally mounted on the main frame 34 adjacent the upstream end of the conveyor means 30 so that the entire lower conveyor 38 may swing downwardly, as suggested in FIG. 6 of the drawings, to divert the stream of newspapers 32 downwardly in the event of a jam. The conveyor system of the invention includes means 42 for latching the free, downstream end of the lower conveyor 38 in its upper, normal position, as shown in FIG. 3 of the drawings. The conveyor system further includes means 44 responsive to a jam of newspapers 32 between the upper and lower conveyors 36 and 38 for releasing the latching means 42 so that the lower conveyor may swing downwardly, as suggested in FIG. 6, to divert the newspaper stream, thereby preventing damage to the infeed conveyor section 12 and/or the stacking section 14.

The infeed conveyor section 12 is shown in FIG. 3 as including an apparatus 46 for counting the newspapers 32 passing between the upper and lower conveyors 36 and 38. This counting apparatus controls the operation of the stacking section 14 in such a manner as to deposit a predetermined number of newspapers in each stack 20. The counting apparatus 46 is conventional and will not be described further herein.

Considering the upper conveyor 36 in more detail, and with particular reference to FIGS. 3 and 6, it includes an upstream roller 48 and intermediate sheaves 50 suitably mounted on the main frame 34 adjacent the upstream end of the conveyor means 30. Belts 52 are trained around the roller 48 and the sheaves 50 in suitable grooves, not shown, therein. It will be noted that the portion of the upper conveyor 36 formed by the roller 48, the sheaves 50 and the belts 52 converges relative to the lower conveyor 38 in the downstream direction. This construction insures that the stream of overlapped newspapers 32 will enter the space between the upper and lower conveyors 36 and 38 properly.

The upper conveyor 36 further includes two downstream belts 54 trained around the intermediate sheaves 50 and over downstream sheaves 56, these belts also being disposed in suitable grooves, not shown, in the sheaves 50 and 56. As shown in FIG. 3, the downstream sheaves 56 are positioned downstream from and slightly below the downstream end of the lower conveyor 38, being mounted on arms 58 which are fixedly connected to stub shafts 60 pivotally mounted on the main frame 34 above the downstream end of the lower conveyor. With this construction, the downstream sheaves 56 tend to press the downstream belts 54 downwardly against the stream of overlapped newspapers 32 passing between the upper and lower conveyors.

As suggested in FIG. 6 of the drawings, the downstream belts 54 of the upper conveyor 36 are normally somewhat slack. As shown in FIG. 3, when the lower conveyor 38 is in its upper, normal position, and when a stream of overlapped newspapers 32 is passing between the upper and lower conveyors, the downstream belts 54 of the upper conveyor are tensioned by the lower conveyor and the stream of newspapers so as to clamp the stream of newspapers slightly between the upper and lower conveyors.

Turning now to a detailed consideration of the lower conveyor 38, the upstream end of the subframe 40 is pivotally connected to the main frame 34 by means of a transverse shaft 62 suitably journalled in the subframe and the main frame and carrying an upstream roller 64 The downstream end of the subframe 40 carries a downstream roller 66. Belts 68 are trained around the upstream and downstream rollers 64 and 66 and operate in suitable annular grooves therein.

Both the upper conveyor 36 and the lower conveyor 38 are driven conveyors, the drive therefor comprising an endless chain 70, FIGS. 4 and 5, trained around a sprocket 72 on the upstream roller shaft 62 of the lower conveyor, and around sprocket 73, FIG. 1, of the upper conveyor. The chain 70 may be driven in any suitable manner, as by a drive sprocket, not shown, within the stacking section 14.

Considering the latching means 42, it includes two latching arms respectively pivotally mounted on the stub shafts 60 on opposite sides of the downstream end of the lower conveyor 38. The latching arms 74 depend from the stub shafts 60 and are provided at the lower ends with rollers 76 insertable in supporting relation under latching lugs 78 on the free end of the subframe 40 at opposite ends of the downstream roller 66. The latching arms 74 are biased toward operative positions, wherein the rollers 76 are disposed under the latching lugs 78, by tension springs 80 connected to the latching arms and to the main frame 34.

As will be apparent, the latching arms 74 support the lower conveyor 38 in its upper position until such time as they are pivoted in the clockwise direction, as viewed in FIGS. 3 and 6, by the jam responsive means 44. The latter includes jam-sensing roller means 82 above the lower runs of the downstream belts 54 of the upper conveyor 36 and spanning the stream of overlapped newspapers 32 passing between the two conveyors. The roller means 82 is supported at its ends by arms 84 of cranks 86 pivotally mounted on the frame 34 at 88. The cranks 86 also include cam arms 90 engageable with rollers 92 on the latching arms 74 to displace the latching arms into their inoperative positions upon formation of a newspaper jam between the upper and lower conveyors 36 and 38.

The roller means 82 is normally supported a distance above the overlapped newspapers 32 sufficient to pass the thickest newspapers to be stacked. Stops 94 engageable by the arms 84 are provided for this purpose. (Other stops 96 engageable by the arms 84 are provided to limit upward movement of the roller means 82.)

Considering the operation of the invention, it will be apparent that if the newspapers 32 jam up between the upper and lower conveyors 36 and 38, the resulting jam quickly engages the roller means 82 of the jam responsive means 44 to pivot the jam responsive means in the counterclockwise direction, as viewed in FIGS. 3 and 6. When this occurs, the cam arm 90 of the cranks 86, acting on the rollers 92, pivot the latching arms 74 in the clockwise direction, as viewed in FIGS. 3 and 6, until the supporting rollers 76 disengage the latching lugs 78 on lower-conveyor subframe 40. As soon as this occurs, the downstream end of the lower conveyor 38 drops downwardly under the influence of gravity, as indicated by the arrow 98 in FIG. 6 of the drawings, the action of gravity on the lower conveyor being supplemented by the downward pressure exerted thereon by the belts 54 and the jammed newspapers. Consequently, the stream of newspapers is diverted downwardly, instead of continuing on into the stacking section 14.

The jam responsive means 44 reacts instantaneously to any jam substantially as it forms, whereby the lower conveyor is released before the jam reaches serious proportions. Consequently, there is no possibility of damage to the infeed conveyor section 12, the stream of newspaper being harmlessly diverted in the downward direction.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In a conveyor system, the combination of:

(a) conveyor means for conveying material along a predetermined path;

(b) said conveyor means including two conveyors; one of said conveyors being positioned above the other for receiving the material therebetween;

(c) releaseable means for maintaining a substantially fixed spacing between said conveyors;

(d) one of said conveyors upon actuation of said releaseable means, being movable to an inoperative position away from the remaining conveyor to divert the material from between said conveyors and away from said predetermined path; and (e) means responsive to a jam of the material between said conveyors for releasing said releasable means to thereby move said movable conveyor to said inoperative position.

2. In a conveyor system, the combination of:

(a) a frame;

(b) conveyor means carried by said frame for conveying articles along a predetermined path;

(c) said conveyor means including upper and lower conveyors receiving the articles therebetween;

(d) said lower conveyor being pivotable downwardly under the influence of gravity to divert the articles from between said conveyors;

(e) means for latching said lower conveyor in its upper position; and (f) means responsive to a jam of the articles between said conveyors for releasing said latching means.

3. A conveyor system according to claim 2 in which said latching means is pivotally mounted on said frame for pivotal movement between an operative position, wherein it engages and supports said lower conveyor in its upper position, and an inoperative position wherein it disengages said lower conveyor.

4. A conveyor system as defined in claim 3 wherein said jam responsive means includes releasing means pivotally mounted on said frame for pivoting said latching means from its operative position to its inoperative position in response to a jam of the articles between said conveyors.

5. A conveyor system as defined in claim 4 wherein said releasing means includes cam means for pivoting said latching means from its operative position to its inoperative position in response to a jam of the articles between said conveyors.

6. A conveyor system as defined in claim 4 wherein said jam responsive means includes roller means engageable with a jam of the articles between said conveyors.

7. A conveyor system as set forth in claim 2 wherein said lower conveyor includes a subframe having a free end engageable by said latching means and having a pivoted end, said conveyor system further including pivot means for pivotally connecting said pivoted end of said subframe to the frame first mentioned.

8. A conveyor system according to claim 7 wherein said pivot means includes a shaft carrying a roller forming part of said lower conveyor.

9. A conveyor system as defined in claim 2 wherein said upper and lower conveyors respectively comprise upper and lower rollers having upper and lower belts trained therearound and receiving the articles therebetween.

10. A conveyor system as defined in claim 2 wherein said lower conveyor has a free end engageable by said latching means and has a pivoted end pivotally connected to said frame and located upstream of said conveyor means from said free end thereof.

11. The conveyor system of claim 1 wherein said movable conveyor is further comprised of first and second roller means;

first belt means being trained around said first and second roller means;

the remaining conveyor being further comprised of third roller means and first sheave means;

first strap means being trained around said first roller means and said first sheave means; and second sheave means; second belt means being trained about said first and second sheave means;

said third roller means being located a spaced distance from said first roller means;

said first sheave means being positioned in close proximity to said first belt means causing said remaining conveyor to converge toward said movable conveyor;

said second sheave means being positioned further toward the down stream end of the conveyors than said second roller means and being further positioned relative to said second roller means causing said first and second belt means to press the material being conveyed therebetween.

12. The conveyor system of claim 1 wherein said releasable means is comprised of;

first roller means;

crank means pivotally mounting said first roller means at one end thereof so as to be adjacent one of said conveyors;

first and second arms each being pivotally mounted at one end thereof near the down stream end of one of said conveyors and each having shoulders at their opposite ends for supporting the down stream end of the other of said conveyors;

second roller means mounted intermediate the ends of said first and second arms;

said crank means having cam means at their opposite ends for engaging an associated second roller means to release the down stream end of the conveyor being supported by said first and second arms when a jam occurs between said conveyors.

13. A conveyor system positioned between a source and a utilization means for conveying material from the source supplying the material to the utilization means, said conveyor system comprising;

first and second conveyors for receiving the material therebetween, said material being received at the upstream end of said system;

third means for maintaining the ends of said first and second conveyors at said upstream end in substantially close proximity to one another;

fourth means located at the down stream end of said conveyor system for releasably maintaining the ends of said first and second conveyors at said down stream end in substantially close proximity to one another;

said fourth means including fifth means responsive to a jam of the material for releasing said fourth means enabling the downstream ends of said first and second conveyors to be substantially uncoupled from one another so as to substantially instantaneously divert the normal flow of the material and thereby prevent the conveyor system, the source and the utilization means from being damaged.

References Cited

UNITED STATES PATENTS

| | | | |
|---|---|---|---|
| 2,802,560 | 8/1957 | Engleson | 198—31 |
| 2,916,138 | 12/1959 | Hume | 198—165 |

EVON C. BLUNK, *Primary Examiner.*

RICHARD E. AEGERTER, *Examiner.*